United States Patent Office 3,755,553
Patented Aug. 28, 1973

3,755,553
METHOD OF PRODUCING SALTS OF ALKALINE EARTH METALS
Sergei Alexeevich Kutolin, ulitsa Demyana Bednogo, 58, kv. 19; Alexandr Ilich Vulikh, ulitsa Demyana Bednogo, 58a, kv. 36; and Anna Egorovna Shammasova, ulitsa Dostoevskogo, 22, kv. 75, all of Novosibirsk, U.S.S.R.
No Drawing. Filed Apr. 18, 1968, Ser. No. 722,192
Int. Cl. C01g 23/00, 33/00, 35/00
U.S. Cl. 423—598                                    7 Claims

ABSTRACT OF THE DISCLOSURE

Alkaline earth metal salts are prepared by heating a charge consisting of alkaline earth carbonates and transition metal oxides at 700–900° C. in an ammonia stream and then in air at 600–750° C.

---

This invention relates to methods of producing salts of alkaline earth metals.

Said compounds are employed as ferroelectrics in electrical and radio engineering and as heat resistant materials for refractory articles and coatings.

A method is known of producing salts of alkaline earth metals of the general formulas $$Me_m^{II}Me_n^{IV}O_{m+2n} \text{ and } Me_m^{II}Me_n^{V}O_{m+2.5n}$$

where
$Me^{II}$=alkaline earth metals Mg, Ca, Sr and Ba or combinations of the same,
$Me^{IV}$=transition metals Ti, Zr and Hf or combinations of the same,
$Me^{V}$=transition metals Nb and Ta or a combination of the same,
$m$ and $n$=numbers expressing the amount of gram-atoms of the metals in a gram-molecule of the salt, by thermal treatment of a charge containing carbonates of alkaline earth metals and oxides of said transition metals in the air at a temperature of 1300–1400° C.

A disadvantage of said known method is the high temperature at which the charge is treated, which complicates plant for implementation of the process.

Another disadvantage of the known method is the necessity for very lengthy heat treatment of the charge for its quantitative conversion. In practice the process is not continued until the charge is completely converted and as a consequence the final product as a rule contains substantial amounts of free oxides, alkaline earth metals and transition metals. In the case of synthesis of barium salts the product contains 0.5–1% BaO.

It is an object of the present invention to eliminate the above disadvantages.

It is a further and more specific object of the invention to provide a method of producing salts of alkaline earth metals of the above general formulas enabling a substantial lowering of the temperature of the process and ensuring quantitative conversion of the charge in a shorter time.

These objects have been accomplished by the provision of a method of producing salts of alkaline earth metals, wherein the charge containing carbonates of alkaline earth metals and oxides of the above mentioned transition metals are heat treated, according to the invention, at a temperature of 700–900° C. in a stream of ammonia and then in the air at a temperature of 600–750° C.

The present method of producing salts of alkaline earth metals is carried out as follows.

The charge containing carbonates of alkaline earth metals and oxides of transition metals (titanium, zirconium, hafnium, niobium and tantalum) is comminuted to minus 200 mesh per sq. cm. and charged directly into a tube furnace or into vessels placed in a furnace. The lining of furnace and vessels may be graphite, porcelain or other ceramic materials.

During the first stage of the process the charge is treated in a stream of ammonia fed in at a linear velocity of ~5 cm./sec., at a temperature of 700–900° C. over a period of 2–3 hours.

In these conditions reduction of the oxides of the transition metals and their reaction with the carbonates of the alkaline earth metals is not complete. Intermediate compounds are formed having the general formulas $$Me_m^{II}Me_n^{IV}O_{m+2n-x} \text{ and } Me_m^{II}Me_n^{V}O_{m+2.5n-y}$$

where $x$ and $y$ are numbers expressing the number of gram-atoms of oxygen lost by a gram-molecule of oxide of transition metal when it is not completely reduced.

For instance, when preparing compounds having the formulas $BaM^{IV}O_3$ and $BaMe_2^{V}O_6$, the intermediate products in the first stage of the process have the composition $BaMe^{IV}O_{2.5-2.8}$ and $BaMe_2^{V}O_{4.5-5.0}$, $x$ being equal to 0.2–0.5 and $y$, to 1.0–1.5.

Essentially the first stage of the process may be expressed by the following equations:

$$mMe^{II}CO_3 + nMe^{IV}O_2 + \frac{2}{3}xNH_3 = Me_m^{II}Me_n^{IV}O_{m+2n-x}$$
$$+ \frac{x}{3}N_2 + xH_2O + mCO_2$$

$$mMe^{II}CO_3 + \frac{n}{2}Me_2^{V}O_5 + \frac{2}{3}yNH_3 = Me_m^{II}Me_n^{V}O_{m+2.5n-y}$$
$$+ \frac{y}{3}N_2 + yH_2O + mCO_2$$

The nitrogen, water vapour and carbon dioxide formed in the first stage are carried away by the stream of ammonia.

In the second stage of the process the intermediate compounds formed are held in the air or in a stream of air at a temperature of 600–750° C. for 1–2 hours, during which period said intermediates are oxidized with atmospheric oxygen, this being expressed by the following equations:

$$Me_m^{II}Me_n^{IV}O_{m+2n-x} + \frac{x}{2}O_2 = Me_m^{II}Me_n^{IV}O_{m+2n}$$

$$Me_m^{II}Me_n^{V}O_{m+2.5n-y} + \frac{y}{2}O_2 = Me_m^{II}Me_n^{V}O_{m+2.5n}$$

For a better understanding of the present invention the following examples of the preparation of salts of alkaline earth metals are given by way of illustration.

EXAMPLE 1

To produce barium metatitanate, $BaTiO_3$, a charge is prepared consisting of 86.3 g. of barium carbonate and 34.8 g. of titanium dioxide. The charge is placed in a porcelain boat and held in a stream of ammonia fed in at a rate of 5 cm./sec. at a temperature of 800° C. for 3 hours. The flow of ammonia is thereupon stopped and the charge held in the air at 700° C. for 2 hours.

Yield 98.5 g. or 98.5% of theory.

Found, percent by weight: BaO 65.55; $TiO_2$ 34.05. Calculated for $BaTiO_3$ percent by weight: BaO 65.74; $TiO_2$ 34.26.

According to X-ray phase analysis the product consists entirely of the phase $BaTiO_3$.

EXAMPLE 2

To produce barium metaniobate, $BaNb_2O_6$, a charge is prepared consisting of 48.0 g. of barium carbonate and 63.2 g. of niobium pentoxide. The charge is placed in a porcelain tube furnace and held in a stream of ammonia fed in at a rate of 5 cm./sec. at a temperature of 800° C.

for 3 hours. The flow of ammonia is thereupon stopped and the charge held in the air at 650° C. for 2 hours.

Yield 98 g. or 98% of theory.

Found, percent by weight: BaO, 36.5; $Nb_2O_5$, 63.3. Calculated for $Ba_2Nb_2O_6$, percent by weight: BaO, 36.58; $Nb_2O_5$, 63.42.

According to X-ray phase analysis the product consists entirely of the phase $BaNb_2O_6$.

EXAMPLE 3

To produce calcium metazirconate, $CaZrO_3$, a charge is prepared consisting of 55.9 g. of calcium carbonate and 68.8 g. of zirconium dioxide. The charge is placed in a tube furnace and held in a stream of ammonia fed in at a rate of 5 cm./sec. at a temperature of 900° C. for 3 hours, and then in a stream of air at 700° C. for 2 hours.

Yield 99 g. or 99% of theory.

Found, percent by weight: CaO, 31.45; $ZrO_2$, 68.3. Calculated for $CaZrO_3$, percent by weight: CaO, 31.28; $ZrO_2$, 68.72.

According to X-ray phase analysis the product consists entirely of the phase $CaZrO_3$.

EXAMPLE 4

To produce calcium barium metatitanate, $CaBaTiO_6$, a charge is prepared consisting of 27.1 g. of a calcium carbonate, 53.5 g. of barium carbonate and 43.3 g. of titanium dioxide. The charge is placed in a tube furnace and held in a stream of ammonia fed in at a rate of 5 cm./sec. at a temperature of 900° C. for 3 hours, whereupon the flow of ammonia is stopped and the charge is held in the air at a temperature of 750° C. for 2 hours.

Yield 98.5 g. or 98.5% of theory.

Found, percent by weight: CaO, 15.25; BaO, 41.4; $TiO_2$, 43.3. Calculated for $CaBaTi_2O_6$, percent by weight: CaO, 15.19; BaO, 41.53; $TiO_2$, 43.28.

According to X-ray phase analysis the product consists entirely of the phase $CaBaTi_2O_6$.

Though the present invention has been described in a preferred embodiment it will be understood that there may be changes and variations without departing from the spirit and scope thereof, as those skilled in the art will be able to perceive. These changes and variations are to be considered as falling within the spirit and scope of the invention as defined in the appended claims.

We claim:

1. A method of producing salts of alkaline earth metals of the general formulas $$Me_m^{II}Me_n^{IV}O_{m+2n} \quad \text{(salt type I)}$$

$$Me_m^{II}Me_n^{V}O_{m+2.5n} \quad \text{(salt type III)}$$

where $Me^{II}$ is an alkaline earth metal selected from the group consisting of Mg, Ca, Sr, Ba, and combinations thereof, $Me^{IV}$ is a transition metal selected from the group consisting of Ti, Zr, Hf, and combinations thereof, $Me^V$ is a transition metal selected from the group consisting of Nb, Ta, and combinations thereof, $m$ and $n$ express the amount of gram-atoms of the metals in a gram-molecule of the salt, $m/n=1$ (for salt type I) and $m/n=\frac{1}{2}$ (for salt type II), said method comprising subjecting a charge containing carbonates of alkaline earth metals and oxides of said transition metals to heat treatment at a temperature of 700–900° C. in a stream of ammonia to effect one of the following reactions $$mMe^{II}CO_3 + nMe^{IV}O_2 + \frac{2}{3}xNH_3 \rightarrow$$

$$Me_m^{II}Me_n^{IV}O_{m+2n-x} + \frac{x}{3}N_2 + xH_2O + mCO_2$$

$$mMe^{II}CO_3 + \frac{n}{2}Me_2^{V}O_5 + \frac{2}{3}yNH_3 \rightarrow$$

$$Me_m^{II}Me_n^{V}O_{m+2.5n-y} + \frac{y}{3}N_2 + yH_2O + mCO_2$$

and then subjecting the resulting salts, after removal of the nitrogen, water and carbon dioxide to heat treatment at a temperature of 600–700° C. in air to effect one of the following reactions so as to obtain the desired product $$Me_m^{II}Me_n^{IV}O_{m+2n-x} + \frac{x}{2}O_2 \rightarrow Me_m^{II}Me_n^{IV}O_{m+2n}$$

$$Me_m^{II}Me_n^{V}O_{m+2.5n-y} + \frac{y}{2}O_2 \rightarrow Me_m^{II}Me_n^{V}O_{m+2.5n}$$

2. A method according to claim 1 wherein heating in the stream of ammonia is effected for 2–3 hours.

3. A method according to claim 1 wherein heating in air is effected for 1–2 hours.

4. A method according to claim 1 wherein $Me^{II}$ is Ba and $Me^{IV}$ is Ti; said salt being $BaTiO_3$.

5. A method according to claim 1 wherein $Me^{II}$ is Ba and $Me^{V}$ is Nb; said salt being $BaNb_2O_6$.

6. A method according to claim 1 wherein $Me^{II}$ is Ca and $Me^{IV}$ is Zr; said salt being $CaZrO_3$.

7. A method according to claim 1 wherein $Me^{II}$ is Ca and Ba and $Me^{V}$ is Ti; said salt being $CaBaTi_2O_6$.

References Cited

UNITED STATES PATENTS

| | | | |
|---|---|---|---|
| 2,173,258 | 9/1939 | Lederer | 23—51 X |
| 2,208,692 | 7/1940 | Wamsley | 23—51 X |
| 3,366,443 | 1/1968 | Lauder et al. | 23—21 |

FOREIGN PATENTS

| | | | |
|---|---|---|---|
| 820,035 | 7/1937 | France | 23—50 |

OTHER REFERENCES

Barksdale: "Titanium," 2nd edition, 1966, pp. 119–127.

Ehret, "Smith's College Chemistry," 6th edition, 1946, p. 349.

Morel et al.: "A Study of Selected Metallic Borides, Nitrides and Phosphides," PB 112, 734, Published Mar. 4, 1954, pp. 5–6.

MILTON WEISSMAN, Primary Examiner

U.S. Cl. X.R.

423—593